Sept. 9, 1969  A. L. DECKER  3,466,383
PLASTIC CONDUIT JOINT
Filed Dec. 12, 1966
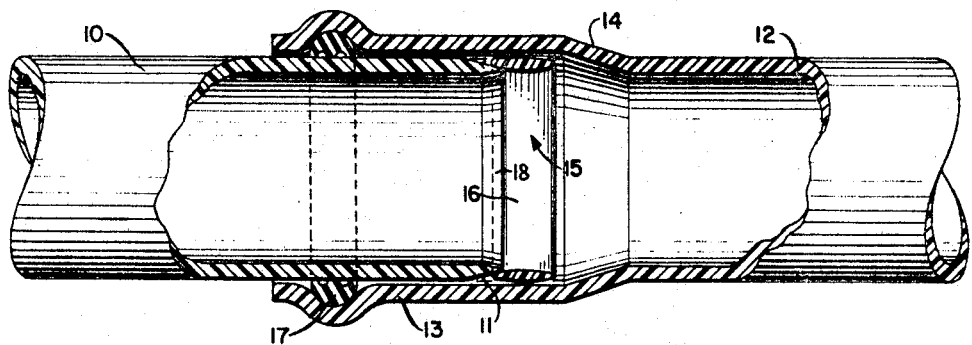
FIG. 1.
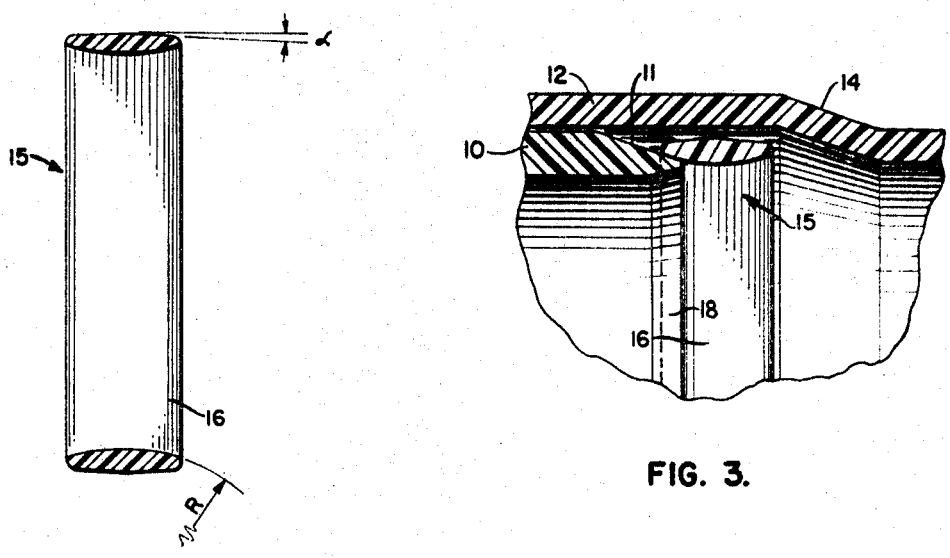
FIG. 2.
FIG. 3.

United States Patent Office 3,466,383
Patented Sept. 9, 1969

3,466,383
PLASTIC CONDUIT JOINT
Arthur L. Decker, Baton Rouge, La., assignor to Ethyl Corporation, New York, N.Y., a corporation of Virginia
Filed Dec. 12, 1966, Ser. No. 601,093
Int. Cl. H02g 1/14
U.S. Cl. 174—84                    3 Claims

ABSTRACT OF THE DISCLOSURE

This joint is used in electrical conduits made from a plastic material. The joint is provided with an annular insert having a rounded or other non-engaging interior surface. The insert is placed between the end of the straight cylindrical, or spigot, conduit member and the bottom of the belled portion of the belled end conduit member. The insert prevents hang up of the forward end of either electrical wires or a "fish tape" used to pull the wires through made-up plastic electrical conduit having joints therein.

---

Rigid plastic electrical conduit, particularly that made from rigid polyvinyl chloride, is finding increasing use in the building industry today. PVC electrical conduit has a number of advantages; low cost, light weight, corrosion resistance, fabrication ease, non-flammability, and many others. However, due to the coefficient of expansion of polyvinyl chloride it is necessary to include in electrical conduit installations a provision for expansion and contraction. This is done by providing for some longitudinal sliding movement in the joints of the conduit. These joints are conventional bell and spigot type wherein a straight cylindrical end of one conduit is slidingly received in the belled end of the other conduit member. In one style of plastic PVC conduit the straight cylindrical end member is provided with an inwardly directed beveled portion on the outside surface at the end thereof. The beveled surface is provided to facilitate make up of the joint, i.e., to provide for easy insertion of the straight cylindrical member through the elastic seal ring and into the belled end member. In a normal installation the end of the straight cylindrical conduit is usually not bottomed against the bell wall of the receiving conduit in order to permit expansion and contraction of both conduit members to occur. The presence of the beveled end on the straight cylindrical conduit member can cause hang up of electrical wires or fish tape when being run through the conduit from the direction of the belled end member.

Therefore, it is an object of the present invention to provide a plastic conduit joint which will prevent hang up of objects passing therethrough.

Another object of the present invention is to provide a plastic conduit joint which can be readily made up utilizing a minimum number of component parts.

A further object of the present invention is to provide a plastic conduit joint which includes a beveled insert that can not be incorrectly installed.

An additional object of the present invention is to provide a plastic conduit joint which includes a beveled insert one size of which is suitable for use with either thick or thin walled plastic conduit.

The foregoing objects together with additional objects are achieved, in general, in a plastic conduit joint including a first plastic cylindrical conduit having an integral belled portion at one end thereof. One end of a second plastic cylindrical conduit is closely and slidably received in the belled portion of the first conduit. The second conduit is provided with an extreme end portion having a beveled outside and inside surface. An annular insert is positioned in the belled portion of the first conduit between the end of the second conduit and the bottom of the belled portion.

The foregoing objects, aims, and attendant advantages will be set forth in detail in the following description of the invention together in conjunction with the drawing.

In the drawing:
FIGURE 1 is an axial sectional view of a plastic conduit joint in accordance with the present invention;
FIGURE 2 is an enlarged axial sectional view of the beveled insert used in the joint of FIGURE 1; and
FIGURE 3 is an enlarged sectional view of a portion of FIGURE 1.

Referring now to FIGURE 1, the plastic conduit joint of the present invention includes a first plastic cylindrical conduit 10 having a straight cylindrical, or spigot, end portion. The extreme end portion of the first conduit 10 is provided with an inwardly directed beveled surface 11 on its exterior and an outwardly directed beveled surface 18 on its interior. The second plastic cylindrical conduit 12 has a belled end portion 13 provided at one of its ends. The belled end portion 13 of the second conduit slidingly receives the straight cylindrical end of the first cylindrical conduit 10. The beveled surface 11 at the end of conduit 10 permits easy insertion of this member through the elastic seal ring 17 and into the belled end portion 13 of conduit 12. The belled end portion 13 includes an inwardly sloping shoulder 14. In order to provide for expansion in each joint in a run of plastic conduit the beveled end portion 11 of conduit 10 must be positioned some distance, e.g., about ⅛" to ¼", away from the shoulder 14 in the bottom of the belled end portion 13 of conduit 12. Positioning of conduit 10 in this manner permits longitudinal expansion and contraction of each conduit without opening the joint or causing any compression along the length of the conduit. The elastic seal ring 17 in the belled end portion 13 of conduit 12 maintains a tight joint seal while permitting expansion and contraction movements of each conduit.

An annular insert 15 is provided in the joint between the beveled end 11 of conduit 10 and the shoulder 14 of conduit 12. As can be seen in FIGURES 2 and 3 the annular insert 15 has an inwardly contoured interior surface 16 which presents no projections to cause the end of a wire or fish tape to hang up. In the embodiment shown in the drawing, interior surface 16 is convex in shape and permits the annular insert to snugly fit over a portion of the beveled end 11 of conduit 10. However, the surface may have other shapes, e.g., it may be shaped like the sides of an equilateral triangle. The insert preferably has a slight bevel from the center to each edge on its outer surface. As seen more clearly in FIGURE 3 the inside diameter of the annular insert is slightly greater than the inside diameter of conduit 10 but less than the outside diameter of conduit 10. The outside diameter of the annular insert 15 should be slightly less than the inside diameter of the belled end portion 13 of conduit 12 in order to provide a sliding fit. The tip portion of the beveled surface 11 will rest against a portion of the convex interior surface 16 of insert 15 when the insert is pushed against conduit 10 by a wire or fish tape. The insert may be positioned anywhere in the space between the end of conduit 10 and the shoulder 14 so that when it is contacted by a wire or fish tape being inserted from conduit 12 it will be pushed up over the end of conduit 10 and prevent the wire or fish tape from hanging.

When a joint is made up as seen in FIGURE 3, the interior surface is substantially free from angular projections which could hang up the end of electrical wires or fish tape being run through the joint from the direction of conduit 12. Additionally, the absence of any sharp edges insures that no cutting or scuffing of the insulation on the electrical wire will occur when the wire is run through the joint. It can be seen that the joint without the annular insert 15 would permit hang up on the beveled end 11 of conduit 10. When an outwardly flexed wire or fish tape is run through conduit 12 it will always make contact with the annular insert 15 which if not already covering the beveled surface 11 will be pushed by the wire up against the end of conduit 10 thus permitting the wire to slide readily past the end of conduit 10 and on through the joint.

In an exemplary plastic joint constructed in accordance with the present invention, the first and second plastic cylindrical conduits 10 and 12 were made of PVC and had an outside diameter of 2.375". Each conduit had a wall thickness of 0.155". The belled end portion 13 of conduit 12 had an inside diameter of 2.393" and a total length of 3.722". The shoulder portion 14 had a diverging angle of 15° from the longitudinal axis of the joint. The beveled end 11 also had an angle of 15° to the horizontal axis of the joint. The beveled annular insert had a bevel angle alpha equal to 1½° to each edge from radial center on its outer surface. The convex interior surface 16 was formed as an arc of a circle having a radius R of 1". The insert had a maximum outside diameter of 2.375" and a minimum internal diameter of 2.175" and was 0.625" wide. The edges of the insert were rounded on a 1/64" radius.

From the foregoing description of the invention, it will be obvious to persons skilled in the art to make various modifications thereto and it is understood that such modifications are included within the spirit and scope of the invention.

What is claimed is:
1. A plastic conduit joint including:
 (a) a first plastic cylindrical conduit having an integral belled portion at one end thereof, a reduced diameter portion, and a gradually tapered wall connecting the belled portion to the reduced diameter portion;
 (b) a second plastic cylindrical conduit having one end provided with an inside and outside beveled surface which is slidably received in said belled portion and normally positioned to provide a space between said beveled end and said tapered wall;
 (c) an annular seal ring positioned between said belled portion and said second conduit;
 (d) a rigid annular insert positioned completely in the space between said beveled end and said tapered wall, the inner and outer diameters of said insert being so dimensioned and the inner and outer axial shape of said insert being such that said ring will at least partially ride up on said outside beveled surface of said second conduit, said insert having an internal diameter greater than the internal diameters of said second conduit and said reduced diameter portion, said insert having an axial length substantially less than said space between said beveled end and the bottom of said tapered wall of said first conduit whereby said insert can be pushed axially into contact with said outside beveled surface of said second conduit by electrical wires or fish tape passing through said plastic joint.

2. The combination of claim 1 wherein said annular insert has an inwardly contoured interior surface and a diameter such that a portion of the beveled end of said second conduit will extend into the interior of said insert when the two are placed in contact.

3. The combination of claim 1 wherein said annular insert has a convex interior surface.

References Cited

UNITED STATES PATENTS

| 648,363 | 4/1900 | Stultz | 285—374 X |
| 2,947,800 | 8/1960 | Badeau et al. | 174—83 |
| 3,331,621 | 7/1967 | Bagnulo | 285—374 X |
| 3,353,563 | 11/1967 | Hutton | 285—374 X |

FOREIGN PATENTS

| 181,649 | 4/1955 | Germany. |
| 1,021,654 | 3/1966 | Great Britain. |

THOMAS F. CALLAGHAN, Primary Examiner

U.S. Cl. X.R.

174—83; 285—345, 350, 374